United States Patent
Contractor (10) Patent No.: US 7,564,958 B1
(45) Date of Patent: Jul. 21, 2009

(54) SYSTEM AND METHOD FOR DELIVERY OF A MESSAGE TO MULTIPLE DESTINATIONS

(75) Inventor: Sunil H. Contractor, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 257 days.

(21) Appl. No.: 09/956,289

(22) Filed: Sep. 19, 2001

(51) Int. Cl.
    *H04M 1/64* (2006.01)
(52) U.S. Cl. .............. 379/93.15; 379/88.14; 379/88.22; 709/206
(58) Field of Classification Search .............. 379/88.22, 379/67.1, 88.23, 201, 88.16, 88.17, 88.01, 379/88.02, 88.04, 88.06, 88.18, 93.15, 88.13, 379/88.14; 709/206
    See application file for complete search history.

(56) References Cited

U.S. PATENT DOCUMENTS

| | | | | |
|---|---|---|---|---|
| 4,757,525 A | * | 7/1988 | Matthews et al. ........ | 379/88.26 |
| 5,450,476 A | * | 9/1995 | D'Apuzzo et al. ........ | 379/88.23 |
| 5,870,454 A | * | 2/1999 | Dahlen .................... | 379/88.14 |
| 5,872,926 A | * | 2/1999 | Levac et al. .............. | 709/206 |
| 6,085,101 A | * | 7/2000 | Jain et al. ................. | 455/500 |
| 6,385,306 B1 | * | 5/2002 | Baxter, Jr. ................ | 379/88.13 |
| 6,438,217 B1 | * | 8/2002 | Huna ....................... | 379/88.14 |
| 6,442,250 B1 | * | 8/2002 | Troen-Krasnow et al. ....................... | 379/93.15 |
| 6,445,694 B1 | * | 9/2002 | Swartz ...................... | 370/352 |
| 6,567,504 B1 | * | 5/2003 | Kercheval et al. ........... | 379/69 |
| 6,842,772 B1 | * | 1/2005 | Delaney et al. ............. | 709/206 |
| 6,904,131 B2 | * | 6/2005 | Weksel ..................... | 379/88.14 |
| 6,999,565 B1 | * | 2/2006 | Delaney et al. ............ | 379/88.13 |
| 7,313,229 B1 | * | 12/2007 | Sherwood ................ | 379/88.22 |

* cited by examiner

*Primary Examiner*—Olisa Anwah (57) ABSTRACT

A message is delivered to multiple communication stations. The message is received from a first communication station. An indication of a plurality of destination communication stations is also received from the first communication station. For each destination communication station, the message is annunciated. If a destination communication station is a telephone station, the telephone number corresponding to the telephone station is dialed, an answer status is received, and the message is annunciated to the telephone station.

16 Claims, 6 Drawing Sheets

SYSTEM AND METHOD FOR DELIVERY OF A MESSAGE TO MULTIPLE DESTINATIONS

FIELD OF THE INVENTION

The invention generally relates to the field of telecommunications. More particularly, the invention relates to a system and method for delivery of a message to multiple destinations.

BACKGROUND OF THE INVENTION

Very often it is desirable to deliver one message to several people. There are many methods for delivering a message to several people. For example, radio and television can be used to broadcast one message to many people. However, when it is important to deliver the message quickly, most methods are insufficient. For example, if the location of a meeting is changed at the last minute, it may be important to notify all scheduled attendees of the new meeting location. One method of notifying all parties is to send an e-mail to all parties. Some parties, however, may be currently unavailable via e-mail and may not retrieve their e-mail until after the scheduled meeting time. Another method of notifying all parties is to manually telephone and inform each party of the new meeting location. This could take an unacceptably long time to call each party and manually deliver the message to each party. Further, some parties may be currently unavailable by telephone. For such parties, it may take several inconvenient telephone calls before the message can be delivered.

In view of the foregoing, there is a need for a system and method for delivery of a voice message to multiple telephones.

SUMMARY OF THE INVENTION

The invention is directed to delivery of a message to multiple destinations method for delivering a message comprising:

According to an aspect of the invention, a message is received from a first communication station, an indication of a plurality of destination communication stations is received, and the message is sent to each destination communication station.

According to another aspect of the invention, a method is provided for delivering a voice message to multiple telephone stations. The voice message is received from a first telephone station. An indication of destination telephone numbers is also received from the first telephone station, wherein each destination telephone number corresponds to a destination telephone station. The indication may be a group number corresponding to a set of destination telephone numbers or the indication may be the destination telephone numbers themselves. For each destination telephone number, the number is dialed, an answer status is received from the destination telephone station corresponding to the destination telephone number, and the voice message is annunciated to the destination telephone station. Prompts may annunciated for the voice message and the indication of the destination telephone numbers. Each destination telephone number may be redialed at intervals until an answer status is received.

According to yet another aspect of the invention, a password is received from the destination telephone station before annunciating the voice message. If the received password is identical to a predefined password, the voice message is annunciated. Otherwise, the voice message is not yet annunciated, and that destination telephone station may be redialed at a subsequent time.

According to a further aspect of the invention, a delivery status is annunciated to the first telephone station. The delivery status may be either 'delivered' or 'not delivered.' Each destination telephone number and its corresponding delivery status may be annunciated. Alternatively, only destination telephone numbers having a delivery status of 'not delivered' are annunciated.

According to another aspect of the invention, a system for delivery of a message to multiple telephones is implemented on an Advanced Intelligent Network (AIN) based wire line telephone system. The AIN telephone system includes a service switching point electrically coupled to a first telephone station and a service node electrically coupled to the service switching point. The service node includes a data store and executes a service node application. The service node performs the steps for delivering the message to multiple telephones, however, other devices in the AIN may perform some or all of the steps.

According to a further aspect of the invention, a system for delivery of a message to multiple telephones is implemented on a Wireless Intelligent Network (WIN) based wireless telephone system. The wireless telephone system includes a mobile switching center electrically coupled to the first telephone station and a service node electrically coupled to the mobile switching center. The service node includes a data store and executes a service node application. The service node performs the steps for delivering the message to multiple telephones, however, other devices in the AIN may perform some or all of the steps.

The above-listed features, as well as other features, of the invention will be more fully set forth hereinafter.

BRIEF DESCRIPTION OF THE DRAWINGS

The invention is further described in the detailed description that follows, by reference to the noted plurality of drawings by way of non-limiting illustrative embodiments of the invention, in which like reference numerals represent similar parts throughout the several views of the drawings, and wherein.

DETAILED DESCRIPTION OF ILLUSTRATIVE EMBODIMENTS

The invention is directed to delivery of a message to multiple destinations. The invention may be implemented on an Advanced Intelligent Network (AIN) based wire line telephone system or a Wireless Intelligent Network (WIN) based wireless telephone system. An exemplary AIN and WIN are described below.

AIN Overview

An AIN is a particular type of telephone system with intelligent devices that handle the messaging and routing of calls. In addition, these intelligent devices may also provide enhanced features. These intelligent devices were first developed and implemented in late 1970's and early 1980's to address the inefficiencies of the then existing telephone system.

In a conventional wire line telephone system, central offices (CO), described below, are interconnected by trunk lines. Trunk lines provide for voice and/or data communication, including for example, telephone calls between telephone users or data between fax machines. Trunk lines are also used by the COs to signal each other for messaging and routing information. To accomplish this signaling, the COs use multi-frequency signaling that occupies bandwidth on the trunk lines, which could otherwise be used for communication. Therefore, the use of multi-frequency signaling decreases the amount of communication that can occur on a given trunk line. The term "communication" or "call" is used herein to include information that may be exchanged between a calling party and a called party over a telephone system.

In a wire line telephone system with AIN capabilities, intelligent devices are included in the telephone system to perform messaging and routing without using the trunk lines, thereby allowing more communication over the trunk lines. Additionally, because these intelligent devices are programmable, they provide the ability for enhanced features. In an AIN wire line telephone system, COs are replaced with service switching point (SSP) central offices, which are central offices that include intelligent network functionality, allowing the SSPs to communicate with the intelligent devices. Preferably, an AIN system with at least AIN Release 0.2 software is utilized to implement the various features and aspects of the invention.

Figure 1:
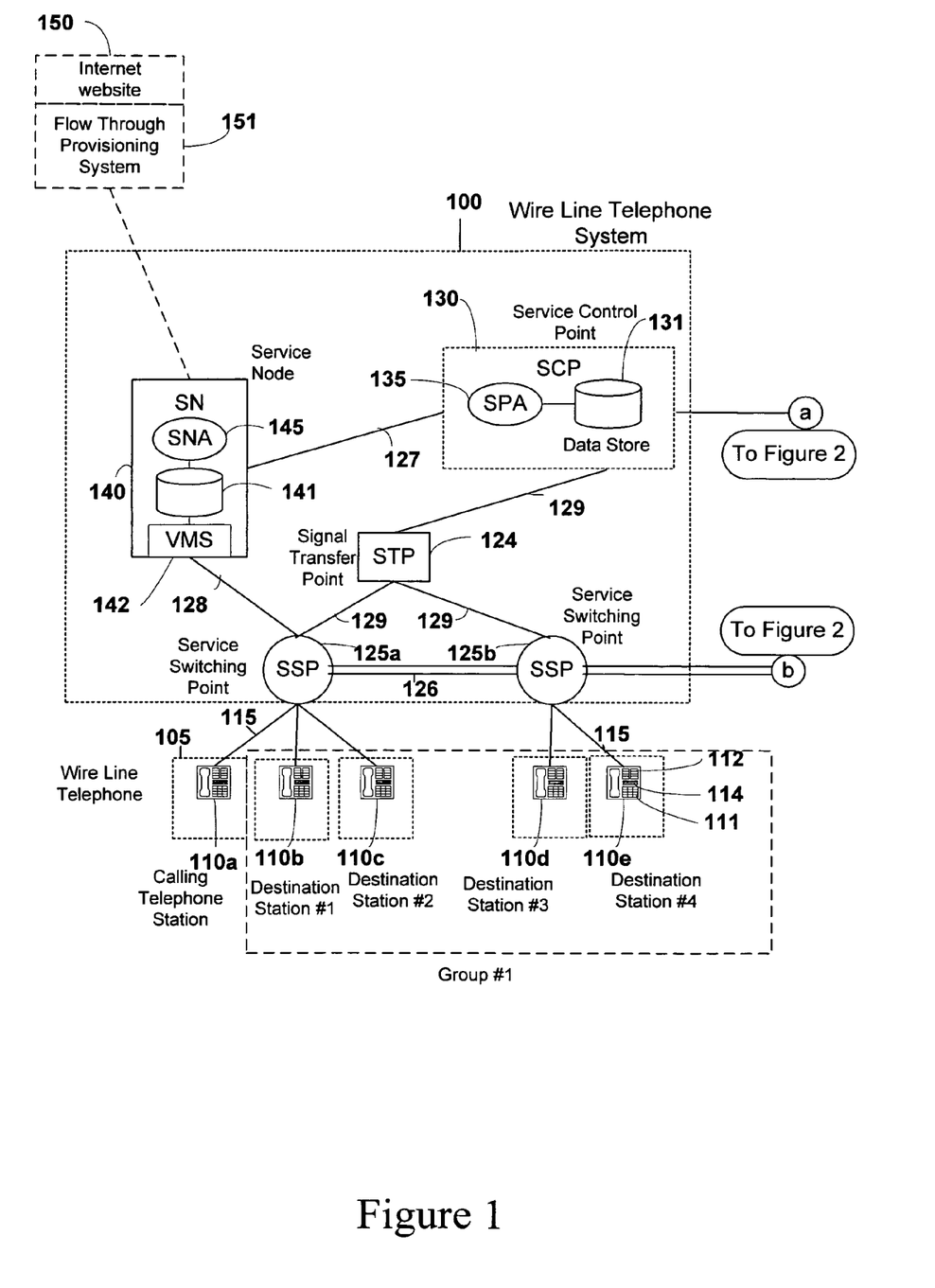
FIG. 1 is a block diagram of an exemplary Advanced Intelligent Network (AIN) based wire line telephone system, with which the invention may be employed.

FIG. 1 is a block diagram of an exemplary AIN-based wire line telephone system. As shown in FIG. 1, AIN wire line telephone system 100 includes a service control point (SCP) 130, a signal transfer point (STP) 124, service switching point central offices (SSPs), shown as 125a, 125b (commonly referred to hereinafter as 125), a service node (SN) 140, and a plurality of subscriber locations 105.

Subscriber locations 105 include telephone stations, which may be a wire line telephone 110. Although wire line telephones 110 are illustrated as the telephone stations in FIG. 1, such stations also may include facsimile machines, computers, modems, and the like. Wire line telephones 110 may include a telephone keypad 111, indicating lamps 112, and a graphical display 114.

Subscriber locations 105 are electrically coupled to SSP 125 via telephone lines 115 (e.g., plain old telephone service (POTS), or the like). A telephone line 115 may also be referred to as a calling line and the terms will be used interchangeably hereinafter. Each SSP 125 serves a designated group of calling lines, and thus, the SSP that serves a particular calling line may be referred to as its serving switch or local SSP. Alternatively, subscriber locations 105 may be electrically coupled to a private branch exchange (not shown), before connecting to SSP 125. Each active calling line in an AIN is assigned a telephone number, typically a ten digit telephone number. The term "telephone number" is used in its generally understood meaning to be the number which is dialed or input into telephone keypad 111 by a calling party or source to reach a telephone station on a calling line associated with the dialed telephone number. A telephone number associated with wire line telephone system 100 is referred to herein as a wire line number. A telephone number associated with a wireless telephone system (e.g., wireless telephone system 200 described below with respect to FIG. 2) is referred to herein as a wireless number.

A party making a telephone call is referred to herein as the calling party and a party intended to be reached is referred to herein as the called party. The telephone number associated with the telephone of the calling party is referred to herein as the calling number. The telephone number associated with the telephone of the called party is referred to herein as the called number. In a typical application, when a calling party dials a called number, the local SSP 125 of the telephone having the calling number (e.g., the calling or originating SSP 125a), couples to SSP 125 (e.g., the called or terminating SSP 125b) of the telephone having the called number, over trunk lines 126. SSP 125 of the telephone having the called number rings the wire line telephone 110 having the called number.

SSPs 125 are each programmable switches which recognize AIN-type calls, launch queries to intelligent devices in the AIN, receive commands and data from the intelligent devices within the AIN to further process and route calls, and can be configured with triggers, which are more fully described below, to initiate AIN actions.

SSPs 125 are also electrically coupled to STP 124 via respective data links 129. Currently, data links 129 employ a signaling protocol referred to as Signaling System 7 (SS7), which is well known to those skilled in the art. The SS7 protocol is a layered protocol, which employs data packets, synonymously referred to as packets, information packets, message packets, or messages. A data packet includes a beginning header, an ending header, and error checking bits.

STPs 124 perform messaging and routing functions between SSPs 125 and SCP 130 on an AIN network. Each SSP 125 is connected to a STP 124, which is its local STP 124. Each STP 124 may be connected to several SSPs 125. If SSP 125 sends a message to another intelligent device on the AIN, SSP 125 will first send the message to its local STP 124. STP 124 will read the message and determine where to route the message. Typically, STP 124 will send the message to SCP 130. SCP 130 will then process the message and send a reply message to the appropriate STP 124. STP 124 will then read the reply message and send that reply message to the appropriate SSP 125.

Much of the intelligence of the AIN resides in SCP 130, which includes a data store 131, and is electrically coupled to STP 124 over data link 129. Typically, SCP 130 is also the repository of service package applications (SPA) 135 that are used in connection with or as part of the data store 131 in the application of telecommunication services or enhanced features to calling lines. SPAs 135 reside on SCP 130 and provide the programmable device with intelligence to process calls and queries sent from SSPs 125 and other AIN devices. SCP 130 receives messages from devices within wire line telephone system 100, processes the messages according to SPA 135, and returns a reply message to the appropriate device in telephone system 100. The messages may include routing requests and/or enhanced features. An example of an enhanced feature available from SPA 135 is caller identification. In caller identification, the called party receives the identification (e.g., the calling name) of the calling party along with the call.

The AIN also includes SN 140, which is an interactive data system that may act as a switch to transfer calls, recognize telephone keypad inputs and voice commands, provide voice synthesis, and/or store messages. SN 140 includes both voice and dual tone multi-frequency (DTMF) signal recognition devices and therefore can respond to both voice commands and telephone keypad 111 commands. SN 140 further includes a voice synthesis device and therefore can annunciate various prompts to telephone stations. Voice synthesis is typically provided by a voice messaging system, described below in more detail. In addition, SN 140 includes a data store 141. Data store 141 may be used to store audio messages and other data. Further, SN 140 may include service node applications (SNA) 145 that are used in connection with or as part of the data store 141 in the application of telecommunication services or enhanced features to calling lines. SN 140 may provide, for example, interactive help, collect voice information from calls, track calls, and provide indication, announcement, and messaging functions.

SN 140 may provide voice messaging features via a voice messaging system 142. Voice messaging system 142 may provide prompts, which are preferably, voice synthesized, recognize telephone keypad inputs and voice commands, dial telephone numbers, and receive, store, and deliver messages. Voice messaging system 142 is preferably included in SN 140, although it may be located elsewhere, such as within the SCP 130, SSP 125 or as a standalone system.

SN 140 is electrically coupled to SCP 130 over data link 127 to provide communication between SN 140 and SCP 130. This communication is typically accomplished with an X.25 protocol or TCP/IP. In addition, SN 140 typically is electrically coupled to one or more SSPs 125 via Integrated Service Digital Network (ISDN) data links as shown by data link 128 between SSP 125*a* and SN 140.

SN 140 is further electrically coupled to an Internet website 150 via a flow through provisioning system 151. The Internet is a vast network of interconnected computers communicating over a collection of networks, including Arpanet, NSFnet, regional networks such as NYsernet, local networks at a number of university and research institutions, and a number of military networks. The protocols generally referred to as Transmission Control Protocol/Internet Protocol (TCP/IP) were originally developed for use through Arpanet and have subsequently become widely used in the industry. The protocols provide a set of services that permit users to communicate with each other across the entire Internet. The specific services that these protocols provide include file transfer, remote log-in, remote execution, remote printing, computer mail, and access to network file systems. Flow through provisioning system 151 may be used to pass data from the Internet to SN 140. In this manner, a user may access an Internet website through any conventional method, for example, dial up through a modem, which can in turn communicate with SN 140 of wire line telephone system 100.

In order to keep the processing of data and calls as simple as possible, a relatively small set of triggers may be defined for each SSP 125. Specific triggers also may be defined for each telephone number. A trigger is an event that generates a message to be sent to a device within the AIN or initiates some action to be taken by a device within the AIN. For example, the trigger may cause SSP 125 to send a query message to SCP 130 requesting instructions to process the call. SCP 130 may then query data store 131 for processing instructions with respect to a particular call. The results of the database inquiry are sent back to SSP 125 in a response from SCP 130 through STP 124. The return message may include call processing instructions to SSP 125. The instructions may command SSP 125 to take some special action as a result of a customized calling service or enhanced feature, for example, forwarding a call to a voice messaging system. In response, SSP 125 may move through its call states, collect telephone keypad inputs, generate further messages, or route calls to complete the command issued by SCP 130.

Various triggers can by configured for each telephone number or for each SSP 125. Triggers may be configured to affect either the calling party, the called party, or both. For example, an Off-hook Trigger may be set on the calling number. If this trigger is set, SSP 125 initiates a query to SCP 130 every time that calling number line is taken off-hook. SCP 130 then processes the query to determine how the call should be processed and replies to SSP 125 with instructions on how the call should be processed. Alternatively, a trigger may be set on the called line number which will trigger an AIN message to be sent.

A telephone call may result in several statuses. A busy status occurs when the called party's line is busy. For example, the called party may currently be using the telephone. A no-answer status occurs when there is no answer on the called party's line after a predefined time. For example, the called party may not be near the telephone 110 to answer. Alternatively, if the called party has forwarded their calls to a second telephone, a no-answer status will occur if there is no answer on the second telephone. Also, in a wireless telephone system 100 the called party may not answer the telephone 110 or the telephone 110 may be turned off. An answer status occurs when the calling party answers the telephone, for example, by taking the telephone 110 off-hook in response to receiving a telephone call. An answer status also occurs when an answering machine or voice messaging system answers the telephone call. Therefore, the predefined time is ideally set to trigger a no-answer status before an answering machine or a voice messaging system answers the call. If however, an answering machine or voice messaging system answers a call, an answer status will be triggered.

Wireless Overview

Figure 2:
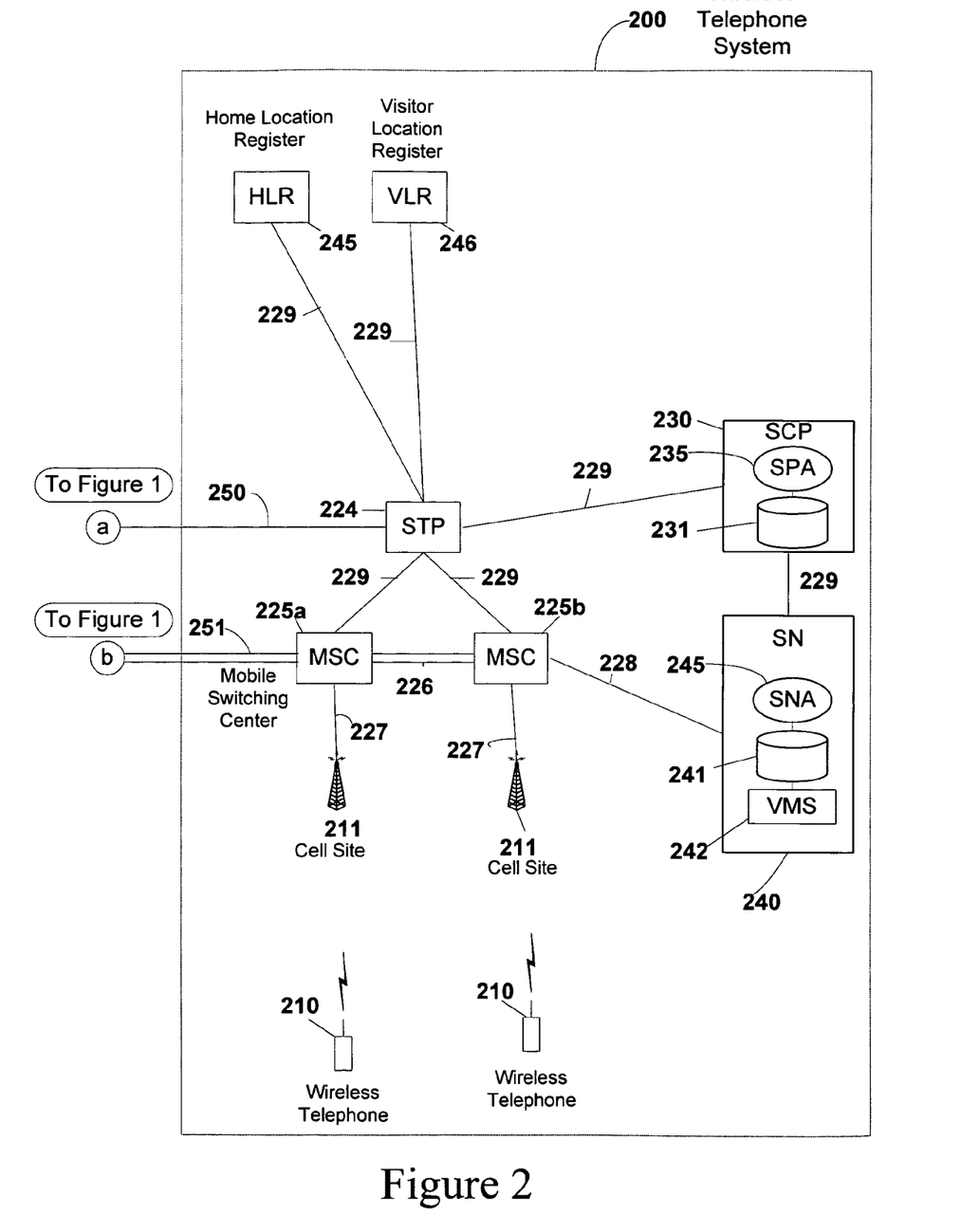
FIG. 2 is a block diagram of an exemplary Wireless Intelligent Network (WIN) based wireless telephone system, with which the invention may be employed.

FIG. 2 illustrates, in block diagram form, a wireless telephone system 200. As shown in FIG. 2, wireless telephone system 200 includes a plurality of wireless phones 210, a plurality of cell sites 211, a plurality of mobile switching centers (MSC) 225, a signal transfer point (STP) 224, a home location register (HLR) 245, and a visitor location register (VLR) 246.

Wireless telephones 210 communicate with cell sites 211. Each cell site 211 covers a particular geographic region called a cell, typically including overlap between cell sites 211. Cell sites 211 are located to maximize the geographic area in which wireless telephone users can access wireless telephone system 200. Cell sites 211 may include sending capability and/or receiving capability and each cell site 211 has a limited number of speech (i.e., data) channels available for communication and at least one control channel for sending and receiving messaging and routing commands. Wireless telephone 210 may request a speech channel from cell site 211 by sending a message over a control channel. Cell site 211 may or may not grant the request depending on current speech channel occupancy.

After wireless telephone 210 has been granted a speech channel, as wireless telephone 210 moves from one cell site to another cell site, MSC 225 tracks the move allowing wireless telephone 210 to maintain communications with wireless telephone system 200.

MSCs 225 are interconnected by a plurality of trunk circuits 226. MSCs 225 also are connected to wire line telephone system 100 through at least one trunk circuit 251. MSCs 225 communicate with cell sites 211 through conventional data links 227. Preferably, base stations (not shown) are electrically coupled between cell sites 211 and MSCs 225.

Each wireless telephone 210 has one MSC 225 assigned as its home MSC 225. Each MSC 225 typically has an associated HLR 245 and a VLR 246. Each HLR 245 keeps data on each of the wireless telephones assigned to the HLR 245. Included in the data residing in HLR 245 is the on/off status of each wireless telephone 210 assigned to HLR 245.

When wireless telephone 210 tries to communicate with wireless telephone system 200 through MSC 225 that is not the user's home MSC 225, the user is still allowed access to wireless telephone system 200. However, in this instance, wireless telephone 210 is considered a visiting wireless telephone and is tracked and monitored by VLR 246. VLR 246 reports information about the visiting wireless telephone to HLR 245 assigned to the wireless telephone 210, including the on/off status of the visiting wireless telephone. Communication between HLRs 245 and VLRs 246 typically use IS-41 specification protocol, well known to those skilled in the art.

Triggers also may be set in wireless telephone system 200. Triggers may be set for each MSC 225 or for each wireless telephone number. Triggers in wireless telephone system 200 operate similarly to triggers in wire line telephone system 100, as described above in connection with FIG. 1. For example, MSC 225 may request HLR 245 for call processing instructions. The reply instructions from HLR 245 may command MSC 225 to take some special action as a result of a customized calling service or enhanced feature, for example, forwarding the call to a voice messaging system. In response, MSC 225 may move through its call states, collect telephone keypad inputs, generate further messages, or route calls necessary to complete the command issued by HLR 245. Various triggers can by configured in wireless telephone system 200. Triggers may be configured to affect either the calling party, the called party, or both. Triggers may be set on a per telephone number basis or on a per MSC 225 basis.

Wire line telephone system 100 may send and receive messaging and routing information to and from wireless telephone system 200 over a data link 250. SCP 130 may be electrically coupled to an STP 224 in wireless line telephone system 200. Data link 250 may be implemented with an SS7 protocol, as described above. In this manner, SCP 130 of wire line telephone system 100 can communicate with any HLR 245 within wireless telephone system 200. Alternatively, SCP 130 may be electrically coupled to each HLR 245 in wireless telephone system 200 (not shown). Again, data link 250 may be implemented with an SS7 protocol.

Wireless telephone system 200 may include a SCP 230 electrically coupled to STP 224 over a data link 229. SCP 230, which functions similar to SCP 130 (as described above in connection with FIG. 1), may be used to provide enhanced features to wireless telephone system 200. SCP 230 includes data store 231 and hosts SPA 235, similar to SCP 130. A SN 240 may be electrically coupled to SCP 230 via a data link 229, and may be electrically coupled to MSC 225 via a data link 228. SN 240, which functions similar to SN 140, may be used to provide enhanced features to wireless telephone system 200, including voice messaging features via VMS 242. SN 240 includes data store 241 and hosts SNA 245, similar to SN 140. When intelligent devices, such as SCP 230 and/or SN 240 are added to wireless telephone system 200, it is referred to as a wireless intelligent network (WIN).

Delivery of a Message to Multiple Destinations

Figure 3:
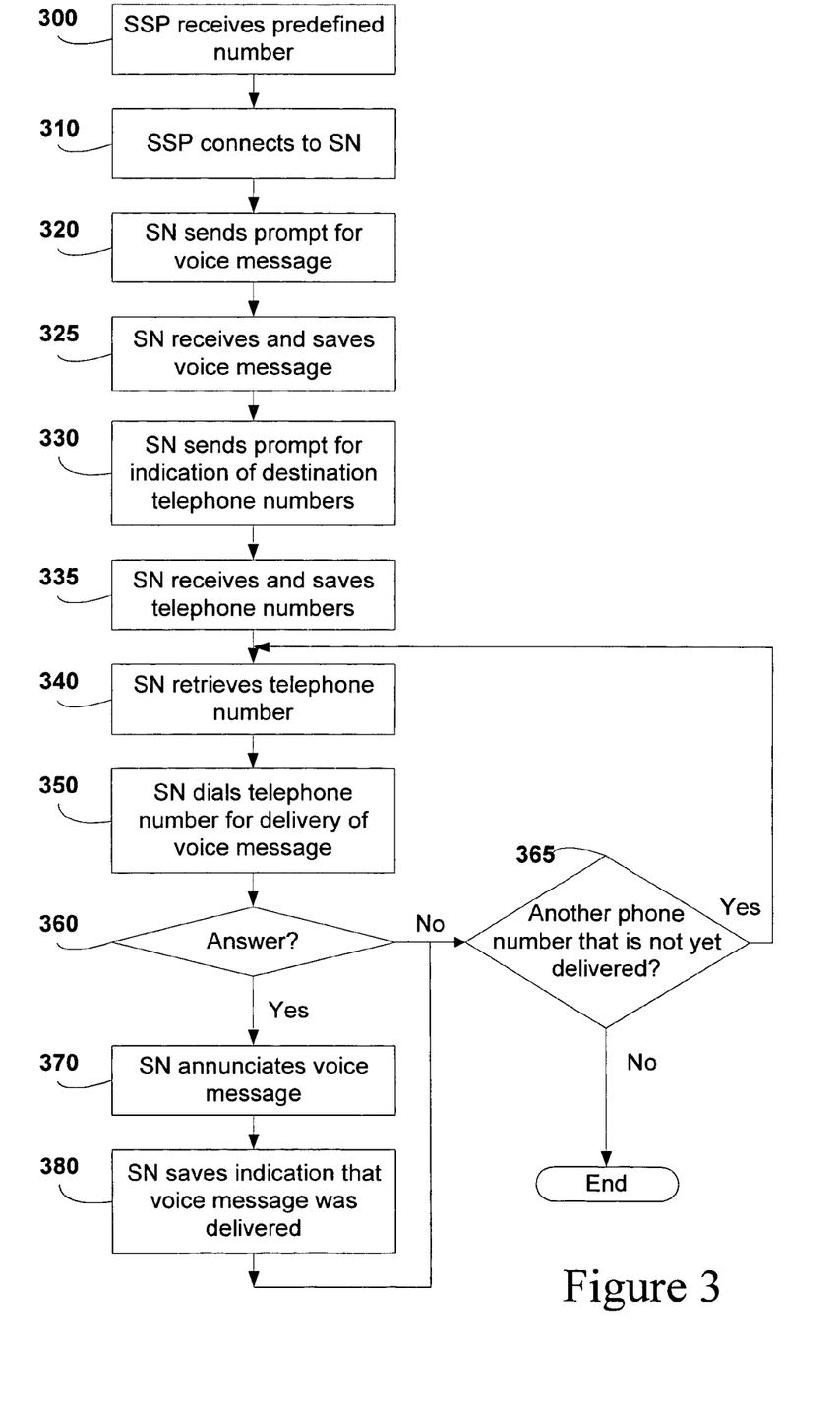
FIG. 3 is a flow diagram of a method for delivery of a voice message to multiple telephones, in accordance with an embodiment of the invention.

FIG. 3 is a flow chart of a method for delivery of a voice message to multiple telephones, in accordance with an embodiment of the invention. In the description below in connection with FIG. 3, the invention is implemented on AIN wire line telephone system 100 of FIG. 1 and the call has been made from wire line telephone 110a, though it is contemplated that the call can be made from any telephone, in any type of intelligent telephone system.

As shown in FIG. 3, at step 300, a calling party takes wire line telephone 110a (i.e., the telephone having the calling number) off-hook and dials a predefined telephone number. SSP 125a receives the predefined number from wire line telephone 110a. The predefined telephone number is a telephone number associated with SN 140. Preferably, the predefined telephone number corresponds to a group line number of SN 140. The group line number is one telephone number that is mapped to a plurality of telephones numbers that correspond to SN 140. In this manner, multiple calling parties may simultaneously access SN 140 via the plurality of telephone numbers.

At step 310, SSP 125a connects wire line telephone 110a to SN 140. Because SN 140 may not be connected to every SSP 125 in a wire line telephone system, SN 140 may connect to SSP 125 of the calling line via other SSPs 125. SN 140, at this point, handles the call processing by executing an application that includes instructions for implementing the steps described below. The application may be executed by SNA 145, by VMS 142, or by a combination of SNA 145 and VMS 142. SSP 125a also may send the calling number to SN 140, which may use the calling number for call processing, as described in more detail below.

At step 320, SN 140 sends, to wire line telephone 110a, a prompt for a voice message. The prompt may be annunciated with audible voice synthesis or with tone generation. For example, SN 140 may annunciate the prompt with audible voice synthesis, such as "Please record message now." The calling party may reply by speaking the message into wire line telephone 110a.

At step 325, SN 140 receives the voice message from wire line telephone 110a. SN 140 also stores the voice message to data store 141 for use in annunciating the message at a later time. The voice message may also be stored in a memory, in data store 131, or the like.

At step 330, SN 140 sends, to wire line telephone 110a, a prompt for an indication of destination telephone numbers. The prompt may be annunciated with audible voice synthesis or with tone generation. For example, SN 140 may annunciate a prompt with audible voice synthesis, such as "Please enter or speak the destination telephone numbers now." The calling party may reply by speaking the destination telephone numbers into wire line telephone 110a or by entering the destination telephone numbers into telephone keypad 111.

At step 335, SN 140 receives the destination telephone numbers from wire line telephone 110a. SN 140 may receive the destination telephone address via DTMF signal recognition or voice recognition techniques. SN 140 saves the destination telephone numbers in data store 141, for use in dialing the destination telephone numbers at a later time. The destination telephone numbers may also be stored in a memory, in data store 131, or the like. Once the destination numbers are received, SN 140 may disconnect from wire line telephone 110a.

SN 140 may facilitate receiving more than one destination telephone number by sending a prompt for each destination telephone number. For example, SN 140 may send a prompt to wire line telephone using voice synthesis, such as "Please enter the first destination telephone number or press the pound key if finished." SN 140 then receives and stores the first destination telephone number and then sends another prompt for another telephone number. Such prompting is repeated until the last telephone number is received (e.g., SN 140 receives the pound key).

At step 340, SN 140 retrieves a destination telephone number. The destination telephone number may be retrieved from a memory, data store 141, data store 131, or the like.

At step 350, SN 140 dials the retrieved destination telephone number for delivery of the voice message to the telephone station corresponding to the retrieved destination telephone number.

At step 360, SN 140 determines if an answer status has been received. If an answer status has been received, processing continues to step 370, for delivery of the message.

Alternatively, before proceeding to step 370, SN 140 may send a password prompt to the telephone having the retrieved destination telephone number. For example, SN 140 may annunciate a prompt with audible voice synthesis, such as "Please enter a password to receive a voice message." The called party may reply using a telephone keypad or by speaking into the telephone. SN 140 receives and processes the reply with DTMF signal recognition or voice recognition techniques. If the reply is not identical to a predefined password, then SN 140 disconnects from the telephone having the retrieved destination telephone number. If the reply is identical to the predefined password, SN 140 then proceeds to step 370. In this manner, SN 140 may confirm that the voice message is annunciated to a person rather than an answering machine or other voice messaging system.

At step 370, SN 140 annunciates the voice message to the telephone station corresponding to the retrieved destination telephone number. In particular, SN 140 may invoke VMS 142 to play the voice message to the telephone station.

At step 380, SN 140 saves an indication that the voice message was delivered to the telephone station. The indication may be saved as a delivery status. That is, each destination telephone number has an associated delivery status of either delivered or not delivered. Each destination telephone number initially has a delivery status of not delivered. As SN 140 plays the voice message to each destination telephone station, its corresponding delivery status is set to delivered. As such, SN 140 can make multiple attempts to deliver the voice message to a particular telephone station, as described below.

At step 360, if an answer status has not been received, processing continues to step 365. At step 365, SN 140 determines if there is another destination telephone number having an "undelivered" status. If there is not another destination telephone number having an "undelivered" status, then SN 140 has delivered the voice message to all the destination telephone stations, and processing ends.

If, however, there is another destination telephone number having a delivery status of not delivered, SN 140 returns to step 340, retrieves that destination telephone number, and proceeds to dial that destination telephone number at step 350. Preferably, SN 140 waits a predefined time period before dialing a destination telephone number a second time.

In the embodiment described in connection with FIG. 3, destination telephone numbers are received from wire line telephone 110*a* at the time the voice message is received. In this embodiment, a user enters each destination telephone number, each time the user desires delivery of a voice message to multiple users. It may be desirable to group destination telephone numbers for delivery of a voice message to all telephone numbers in the group. For example, a little league coach may wish to define a group of destination telephone numbers, where the group includes the telephone numbers of all the players on the team. In this manner, the coach could select the group associated with the team's telephone numbers rather than individually entering each telephone number each time delivery of a voice message is desired.

According to another embodiment of the invention, such grouping of telephone numbers is provided. In this embodiment, illustrated in FIG. 5, the destination telephone numbers are predefined and stored in a data store, such as a memory, data store 131, data store 141, and the like.

Figure 4:
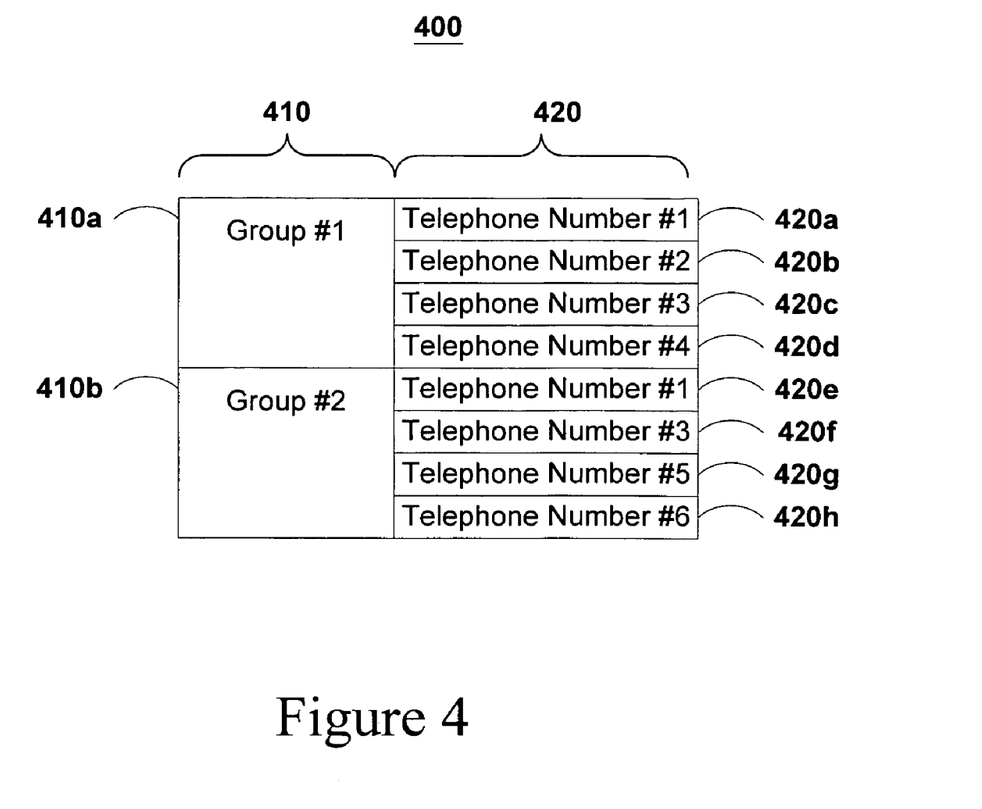
FIG. 4 is a data structure for use in delivering a voice message to multiple telephones, in accordance with an embodiment of the invention.
Figure 5:
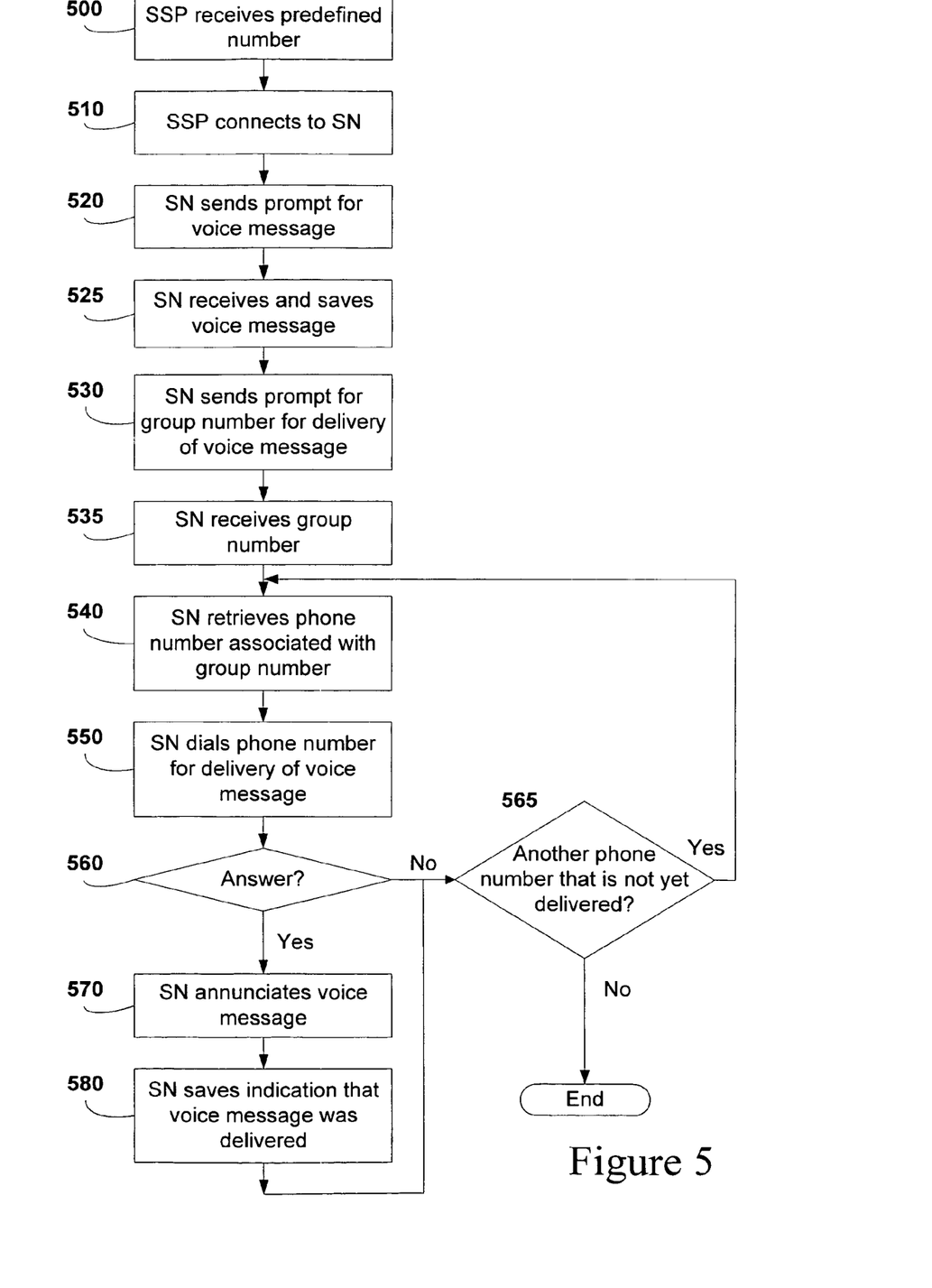
FIG. 5 a flow diagram of another method for delivery of a voice message to multiple telephones, in accordance with another embodiment of the invention.

Before the method of FIG. 5 can be used, a group of destination telephone numbers is predefined and stored. FIG. 4 illustrates a data structure for use in predefining a group of destination telephone numbers, in accordance with an embodiment of the invention. As shown in FIG. 4, data table 400 includes a first segment 410 and a second segment 420. First segment 410 includes a plurality of data fields 410*a* through 410*b*, wherein each data field contains a group number that corresponds to a plurality of destination telephone numbers. Second segment 420 includes a plurality of data fields 420*a* through 420*h*, wherein each data field contains a destination telephone number, and each data field of second segment 420 corresponds to a data field of first segment 410.

To further illustrate, as shown, first segment 410 includes two data fields 410*a* and 410*b* containing 'group #1' and 'group #2,' respectively. Data fields 420*a* through 420*d* of second segment 420 correspond to data field 410*a* of first segment 410, and data fields 420*e* through 420*h* correspond to data field 410*b* of first segment 410. Data fields 420*a* through 420*d* contain 'telephone number #1,' 'telephone number #2,' 'telephone number #3,' and 'telephone number #4,' respectively, and correspond to 'group #1'. Data fields 420*e* through 420*h* contain 'telephone number #1,' 'telephone number #3,' 'telephone number #5,' and 'telephone number #6,' respectively, and correspond to 'group #2'. Thus, multiple data fields of second segment 420 correspond to a single data field of first segment 410. In this manner, a group may include multiple destination telephone numbers. Also, more than one group may be defined. Thus, a user may define several groups, each group being associated with a different set of destination telephone numbers. While a data table is illustrated as implementing the grouping, a relational database, a distributed database, a file, a spreadsheet, and the like are also contemplated. Further, first segment 410 of data table 400 may be optional. Without first segment 410, however, a user is able to predefine one group of destination telephone numbers.

The groups of destination telephone numbers may be defined via a telephone 110 or via an Internet website 150, for example. To define a group of destination telephone numbers via a telephone 110, SN 140 may send prompts to wire line telephone 110 and receive replies via DTMF signal recognition or voice recognition techniques. For example, SN 140 may send a prompt to wire line telephone using voice synthesis, such as "Please enter the first destination telephone number for group #1." SN 140 then receives and stores the first destination telephone number via DTMF signal recognition or voice recognition techniques. SN 140 may the send a prompt for another telephone number, such as "Please enter a destination telephone number for group #1 or press the pound key if finished." In this manner, SN 140 may continue receiving and storing destination telephone numbers of group #1 until the user indicates the last telephone number (e.g., by pressing the pound key).

Alternatively, a group of destination telephone numbers may be defined via an Internet website 150. Internet website 150 may be configured to receive a group number and a group of destination telephone numbers and to send such numbers to SN 140 via flow through provisioning system 151 (as described above in connection with FIG. 1). For example, an Internet website may be configured to present a data table on a screen, similar to the data table of FIG. 4. A user may enter destination telephone numbers into the data table and send the telephone numbers to SN 140 via flow through provisioning system 151.

SN 140 may include systems and methods for providing security of data table 400. SN 140 may include passwords and/or PINs, which are entered before a user may access data table 400. For example, a user dials a telephone number to access SN 140. SN 140 sends a prompt to the user for a password or PIN number. If the user responds with the proper password, the user is allowed to access data table 400. Otherwise, the user is not allowed to access data table 400.

Once a group of destination telephone numbers is defined, the method of FIG. 5 may be used. As shown in FIG. 5, at step 500, SSP 125a receives the predefined number from wire line telephone 110a. At step 510, SSP 125a connects wire line telephone 110a to SN 140. At step 520, SN 140 sends, to wire line telephone 110a, a prompt for a voice message. At step 525, SN 140 receives the voice message from wire line telephone 110a. Each of steps 500 through 525 is similar to the steps 300 through 325, respectively, as described in connection with FIG. 3.

At step 530, SN 140 sends, to wire line telephone 110a, a prompt for a group number. For example, SN 140 may annunciate a prompt with audible voice synthesis, such as "Please enter or speak the group number now." The calling party may reply by speaking the group number into wire line telephone 110a or by entering the group number into telephone keypad 111. For example, the calling party may press a keypad button corresponding to the number one for group number one. Alternatively, the calling party may speak 'group number one' or 'baseball team' into telephone 110a.

At step 535, SN 140 receives the indication of a group number from wire line telephone 110a. SN 140 may receive the group number via DTMF signal recognition or voice recognition techniques.

At step 540, SN 140 retrieves a phone number associated with the received group number. For example, if data table 400 is used to predefine groups of destination telephone numbers and 'group #1' is received in step 535, SN 140 searches through first segment 410 of data table 400 for 'group #1.' Once 'group #1' is read in data field 410a, SN 140 reads an entry from the second segment 420 that corresponds to data field 410a. In this example, SN 140 retrieves one of the telephone numbers contained in data fields 420a through 420d, i.e., one of 'telephone number #1' through 'telephone number #4,' which may correspond to telephone stations 110b through 110e of FIG. 1.

Referring back to FIG. 5, at step 550, SN 140 dials the retrieved destination telephone number. At step 560, SN 140 determines if an answer status has been received. If an answer status is received, processing continues to step 570. At step 570, SN 140 annunciates the voice message to the telephone station corresponding to the retrieved destination telephone number. At step 580, SN 140 saves an indication that the voice message was delivered.

If at step 560, an answer status is not received after a predefined time, processing continues to step 565. At step 565, SN 140 determines if there is another destination telephone number having a delivery status of not delivered. For example, if data table 400 is used and 'group #1' was received at step 535, then SN 140 searches the second data fields 420 corresponding to group #1 for another destination telephone number. SN 140 also determines a delivery status of a destination telephone number. If there is not another destination telephone number having a delivery status of not delivered, then SN 140 has delivered the voice message to all the destination telephone stations, and processing ends. If, however, there is another destination telephone number having a delivery status of not delivered, SN 140 returns to step 540, retrieves that destination telephone number, and proceeds to dial that destination telephone number at step 550.

Figure 6:
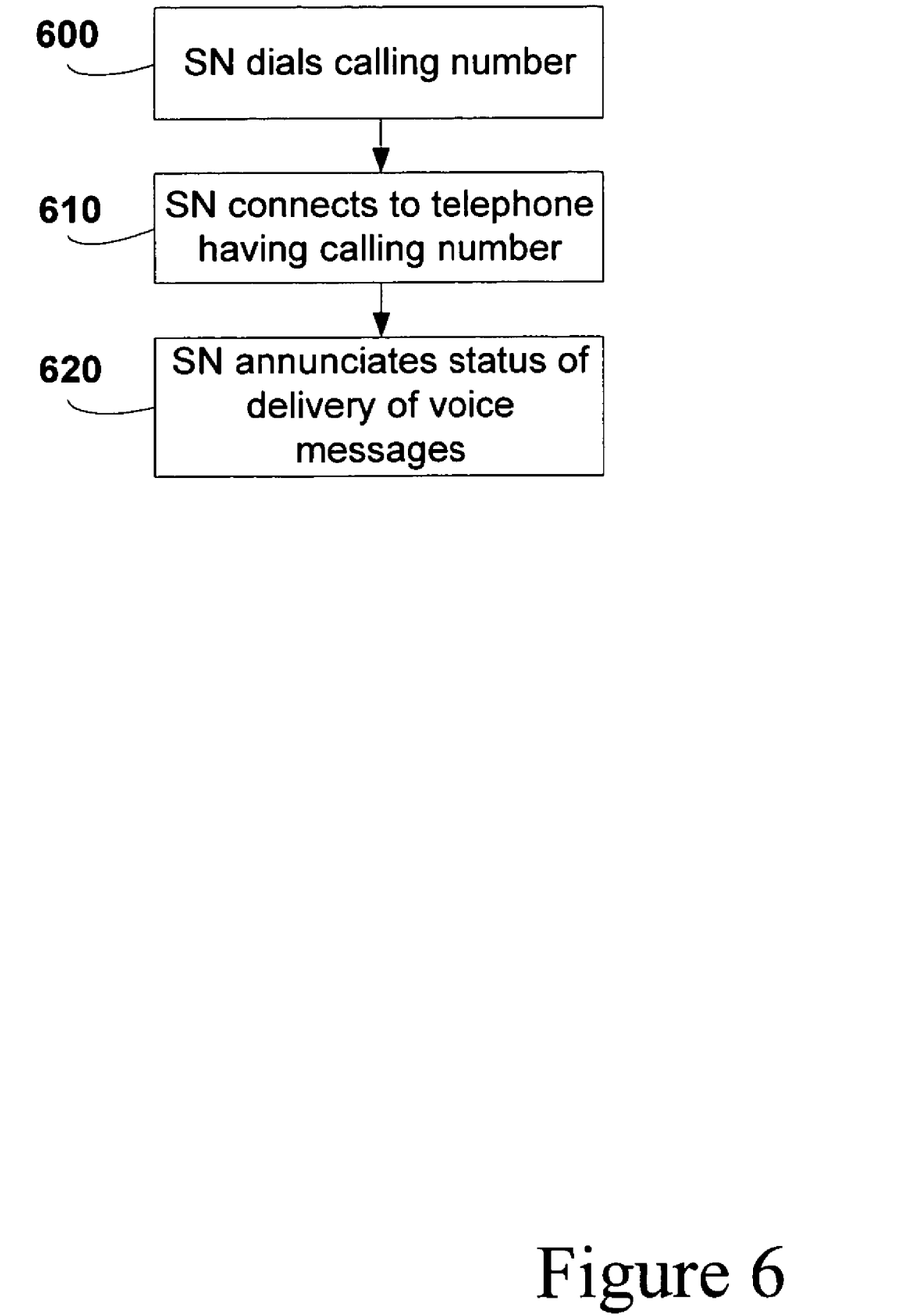
FIG. 6 is flow diagram of yet another method for delivery of a voice message to multiple telephones, in accordance with an embodiment of the invention.

According to another aspect of the invention, the calling party may be notified of the status of the delivery of the voice message. For example, the little league coach may receive a telephone call stating which destination telephone numbers have received the voice message. FIG. 6 is flow diagram of a method for notifying the calling party of the delivery status of the voice message. The method of FIG. 6 may be executed at a predefined time after each destination telephone number has been dialed at least once. The method may also be repeated at intervals until each destination telephone station has received the voice message.

As shown in FIG. 6, at step 600, SN 140 dials the calling number. The calling number may be received by SN 140 from local SSP 125 during step 310 described above.

At step 610, SN 140 connects to the telephone station having the calling number (e.g., wire line telephone 110a).

At step 620, SN 140 annunciates a delivery status of the voice message. SN 140 may annunciate, for each destination telephone number, a delivery status. For example, SN 140 may annunciate, using voice synthesis, "Telephone number #1, delivered, telephone number #2, not delivered . . . " Alternatively, SN 140 may annunciate, only telephone numbers that have a delivery status of not delivered. For example, SN 140 may annunciate, using voice synthesis, "The voice message has not yet been delivered to the following numbers: Telephone number #2."

SN 140 may execute the steps illustrated in FIG. 6 at regular intervals and may continue to execute the steps until the voice message has been delivered to all destination telephone numbers. In this manner, a calling party may remain informed of the delivery status of the voice message.

In another embodiment of the invention, the calling line is a wireless telephone 210. Preferably, in this embodiment the wireless telephone system 200 is a wireless intelligent network (WIN). The devices of the wireless telephone system 200 are configured so that the present embodiment operates similarly to the above described embodiments originating in wire line telephone system 100. SCP 230 and SN 240 in wireless telephone system 200 are adapted analogously to SCP 130 and SN 140, respectively, in wire line telephone system 100.

In yet another embodiment of the invention, a destination communication station may be a network appliance or a computer. For example, in the embodiment described in connection with FIG. 3, rather than destination telephone stations, the destination communication station may be a network appliance or a computer. In this embodiment, the message is sent to the network appliance or the computer. Rather than using a destination telephone number for sending the message, an address is used to send the message to the proper network appliance or computer. For example, an IP address or an e-mail address may be used to send the message to a network appliance or a computer. Further, the message may be sent as a text file or as an audio file, such as a .wav file or the like. If the file is sent as a text file, the message is first converted to text and then sent. If the file is sent as an audio file, the message may be first converted to an audio file compatible with a network appliance or computer and then sent.

Preferably, wire line telephone 110a is a customer of the local service provider. In this manner, billing to the calling party is simplified. SN 140, SPA 130, or another device in the AIN may determine if the calling party is a customer of the local service provider. For example, SCP 130 may receive a query message from SN 140 and SPA 135 may determine whether the calling party is a customer of the local service provider. SPA 135 may determine that the calling party is a customer by analyzing information contained in the query message or by analyzing information contained in data store 131. Preferably, this is determined by comparing the calling party's telephone number to a list of telephone numbers representing the customers of the local service provider, referred to as the customer list. If the calling party's telephone number is in the customer list, then the party is a customer of the local service provider. The invention may end call processing if the calling party is not a customer of the local service provider.

It should be noted that the implementation of the invention is not limited to AIN and WIN based networks, and other advanced or intelligent networks and arrangements may be used to implement the invention. For example, the invention may be implemented on a private branch exchange. Also, while the illustrative embodiments include SN 140 performing various steps, it is contemplated that SCP 130, SSP 125, or some other AIN device may perform similar steps.

The invention may be embodied in the form of appropriate computer software or in the form of appropriate hardware or a combination of appropriate hardware and software. It is noted that the foregoing examples have been provided merely for the purpose of illustration and are in no way to be construed as limiting of the invention. While the invention has been described with reference to illustrative embodiments, it is understood that the words which have been used herein are words of description and illustration, rather than words of limitations. Further, although the invention has been described herein with reference to particular embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for delivering a message comprising:
   determining if a first communication station is associated with a calling party that is a customer of a local service provider;
   ending processing if the first communication station is associated with a calling party that is not a customer of the local service provider;
   receiving a non-text message from the first communication station, wherein the message is an audible voice message, and wherein the first communication station is a first telephone station having a first telephone number;
   storing the non-text message to a data store;
   receiving an indication of a group that represents a plurality of destination communication stations, wherein the first communication station is a different station than each destination communication station, the plurality of destination communication stations comprising a) a destination telephone station and b) at least one network appliance, the group comprising a) a destination telephone number for each destination telephone station and b) and an e-mail address for each network appliance;
   for each destination communication station that is a destination telephone station:
      sending the non-text message to the destination telephone station using the destination telephone number of the destination telephone station, wherein sending the non-text message to the destination telephone station comprises:
         dialing, caused by a voice messaging system, the destination telephone number of the destination telephone station;
         receiving a delivery status from the destination telephone station;
         annunciating the message to the destination telephone station and setting the delivery status of each destination telephone station to a delivered status if the delivery status is an answer status;
         setting the delivery status of each destination telephone station to an undelivered status if a no-answer status or busy status is received from the destination telephone station; and
         automatically redialing the destination telephone number of each destination telephone station set to an undelivered status at predefined time intervals until receiving an answer status;
   for each destination communication station that is a network appliance:
      converting the non-text message to an audio file;
      sending the audio file to the network appliance using the e-mail address of the network appliance; and
   for each destination communication station that is a destination telephone station:
      annunciating, to the destination telephone station, a prompt for a predefined password;
      receiving a password from the destination telephone station; and
      annunciating the message to the destination telephone station only if the received password is identical to the predefined password;
   for each destination communication station, storing an indication that the message has been delivered to the destination communication station, and sending a prompt for the message prior to receiving the message; and
   annunciating, to the first communication station, a delivery status of each destination communication station based on the indication, the annunciation processed after each iteration of dialing the destination stations, wherein the destination stations are dialed at least a second time when a connection is not competed on the first dial.

2. The method of claim 1, wherein annunciating the delivery status comprises annunciating each destination telephone number and each e-mail address and the associated delivery status of either delivered or not delivered.

3. The method of claim 1 further comprising receiving a predefined destination telephone number and predefined e-mail address from an Internet flow through provisioning system and receiving a group number that represents the predefined destination telephone number and predefined e-mail address.

4. The method of claim 1, wherein receiving a message comprises receiving by a service node, receiving an indication comprises receiving by the service node, and sending comprises sending by the service node.

5. The method of claim 1, wherein receiving a message comprises receiving by a private branch exchange, receiving an indication comprises receiving by the private branch exchange, and sending comprises sending by the private branch exchange.

6. A system for message delivery to multiple communication stations, the system comprising:

a switching device electrically coupled to a first communication station, wherein the first communication station is a telephone station; and a service node electrically coupled to the switching device through a first data link, the service node comprising a data store;

the service node comprising instructions, that when executed, cause the service node to perform the following:

determining if a first communication station is associated with a calling party that is a customer of a local service provider;

ending processing if the first communication station is associated with a calling party that is not a customer of the local service provider;

receiving a non-text voice message from the first communication station, wherein the first communication station is a first telephone station;

storing the non-text voice message to a data store;

receiving an indication of a group that represents a plurality of destination communication stations, the plurality of destination communication stations comprising a) a destination telephone station and b) at least one network appliance, the group comprising a) a destination telephone number for each destination telephone station and b) and an e-mail address for each network appliance;

for each destination communication station that is a destination telephone station that connects to a dial attempt, wherein an iteration is configured to facilitate redialing non-connecting destination telephone stations after a predetermined time interval:

annunciating, to the destination telephone station, a prompt for a predefined password;

receiving a password from the destination telephone station; and sending the non-text message to the destination telephone station using the destination telephone number of the destination telephone station;

receiving a delivery status from the destination telephone station;

annunciating the message to the destination telephone station only if the received password is identical to the predefined password and setting the delivery status of each destination telephone station to a delivered status if the delivery status is an answer status;

setting the delivery status of each destination telephone station to an undelivered status if a no-answer status or busy status is received from the destination telephone station; and automatically redialing the destination telephone number of each destination telephone station set to an undelivered status at predefined time intervals until receiving an answer status; and for each destination communication station that is a network appliance:

converting the non-text message to an audio file; and sending the audio file to the network appliance or computer using the e-mail address of the network appliance;

storing the delivery status for each destination communication station for each iteration; and annunciating, to the first communication station, the message delivery status after each iteration for each communication station.

7. The system of claim 6 wherein sending the non-text message to the destination telephone using the destination telephone number of the destination telephone station comprises:

dialing the destination telephone number of the destination telephone station.

8. The system of claim 6 wherein the switching device is a service switching point in a wire line telephone system.

9. The system of claim 6 wherein the switching device is a mobile switching center in a Wireless telephone system.

10. A computer-readable medium having instructions stored thereon for delivering a message to multiple communication stations, the instructions, when executed on a processor, causing the processor to perform the following:

determining if a first communication station is associated with a calling party that is a customer of a local service provider;

ending processing if the first communication station is associated with a calling party that is not a customer of the local service provider;

receiving a non-text message from the first communication station, wherein the non-text message is a voice message, wherein receiving the non-text message comprises receiving a message from a first telephone station having a first telephone number;

storing the non-text message to a data store;

receiving an indication of a group that represents a plurality of destination communication stations, the plurality of destination communication stations comprising a) a destination telephone station and b) at least one network appliance, the group comprising a) a destination telephone number for each destination telephone station and b) and an e-mail address for each network appliance;

for each destination communication station that is a destination telephone station:

sending the non-text message to the destination telephone station using the destination telephone number of the destination telephone station, including:

dialing the destination telephone number of the destination telephone station;

receiving a delivery status from the destination telephone station;

annunciating, to the destination telephone station, a prompt for a predefined password;

receiving a password from the destination telephone station; and annunciating the message to the destination telephone station only if the received password is identical to the predefined password and setting the delivery status of each destination telephone station to a delivered status if the delivery status is an answer status;

setting the delivery status of each destination telephone station to an undelivered status if a no-answer status or busy status is received from the destination telephone station; and automatically redialing the destination telephone number of each destination telephone station set to an undelivered status at predefined time intervals until receiving an answer status; and for each destination communication station that is a network appliance:

converting the non-text message to an audio file;

sending the audio file to the network appliance or computer using the e-mail address of the network appliance or computer; and causing the processor to annunciate, to the first communication station, a delivery status associated with the message, the processor annunciating the delivery status for each delivered and each undelivered call after an iteration of calls.

11. The method of claim 1 further comprising prompting, serially, for entry of destination telephone numbers until receiving the last destination telephone number.

12. The method of claim 1 further comprising receiving a predefined destination telephone number and predefined e-mail address a group number that represents the predefined destination telephone number and predefined e-mail address via a user interface displaying a data table.

13. The method as recited in claim 1 wherein the indication of the group that represents the plurality of destination communication stations is a group name.

14. The method of claim 1 wherein the audio file is a wav file.

15. The system of claim 6 wherein the audio file is a wav file.

16. The computer-readable medium of claim 10 wherein the audio file is a wav file.

* * * * *